United States Patent [19]

Throne

[11] Patent Number: 5,316,711

[45] Date of Patent: May 31, 1994

[54] PROCESS FOR PRODUCING ARTICLES FROM POLYMERS CONTAINING AROMATIC IMIDE LINKAGES

[76] Inventor: James L. Throne, 158 Brookside Blvd., Hinckley, Ohio 44233-9676

[21] Appl. No.: 50,543

[22] Filed: Apr. 20, 1993

[51] Int. Cl.$^5$ .................................................. B29C 67/24
[52] U.S. Cl. ...................................... 264/68; 264/109; 264/126
[58] Field of Search .................. 264/68, 109, 123, 126

[56] References Cited

U.S. PATENT DOCUMENTS

| | | | |
|---|---|---|---|
| Re. 33,214 | 5/1990 | Crocker et al. | 523/303 |
| 3,266,738 | 8/1966 | Goeser et al. | 241/98 |
| 3,278,661 | 10/1966 | Beck | 264/68 |
| 3,847,338 | 11/1974 | Adams | 248/419 |
| 4,059,661 | 11/1977 | Eck et al. | 264/54 |
| 4,142,804 | 3/1979 | Crocker | 366/77 |
| 4,230,615 | 10/1980 | Crocker et al. | 260/34.2 |
| 4,266,919 | 5/1981 | Dunnington et al. | 425/102 |
| 4,272,474 | 6/1981 | Crocker | 264/176 |
| 4,302,413 | 11/1981 | Howe et al. | 264/126 |
| 4,332,479 | 6/1982 | Crocker et al. | 366/77 |
| 4,407,987 | 10/1983 | Crocker et al. | 523/322 |
| 4,420,449 | 12/1983 | Crocker et al. | 264/68 |
| 4,448,738 | 5/1984 | Crocker | 264/54 |
| 4,789,597 | 12/1988 | Gupta et al. | 428/467 |
| 4,820,469 | 4/1989 | Walsh et al. | 264/506 |
| 4,942,007 | 7/1990 | Kunimoto et al. | 264/122 |

OTHER PUBLICATIONS

Vol. 1, No. 4 of Drais News of Draiswerke, Inc., 3 Pearl Court, Allendale, N.J. 07401 entitled "New Developments in Superfast Compounding".

*Primary Examiner*—Mary Lynn Theisen
*Attorney, Agent, or Firm*—Roger D. Emerson

[57] ABSTRACT

A process for producing shaped or molded articles made of polymer particles containing aromatic imide linkages includes the steps of introducing the polymer particles into a chamber for heating the particles, the chamber having a blade which rotates in the chamber and heats the particles by impacting them; heating the polymer particles to a forming temperature; discharging the polymer particles into a shaping device, such as a mold; and, pressurizing the polymer in the shaping device until the polymer particles consolidate into the shape desired. The process has proven to be effective with polymers that are difficult to process, such as thermoplastic polyimide polymers, polyetherimide polymers, bismaleimide polymers, polyarylate polymers, amideimide polymers, and other polymers containing fully reacted aromatic imide linkages.

44 Claims, No Drawings

PROCESS FOR PRODUCING ARTICLES FROM POLYMERS CONTAINING AROMATIC IMIDE LINKAGES

BACKGROUND OF THE INVENTION

1. Field of the Invention

This invention relates to polymers containing aromatic imide linkages, commonly referred to as polyimides (PI). Specifically, the invention relates to the production of articles made from polyimides in shorter times and by simpler methods than has been previously possible.

2. Description of the Related Art

Polyimides are classified as condensation polymers produced from reaction of bifunctional diamines and bifunctional or tetrafunctional carboxylic acid anhydrides. The imide structure —CO—NR—CO is found in the backbone of the polymer chain. Aromatic, heterocyclic imides are known for their exceptional mechanical characteristics and excellent chemical and high temperature resistances. Many types of aromatic polyimides have been created, depending on the amine and acid chemical structures. Pyromellitic dianhydride and di-(4-aminophenyl) ether yields Dupont's commercial polyimide product, Vespel TM. Trimellitic anhydride and an amine such as o-bisaniline or trimellitoyl chloride and methylene dianiline yields Amoco's commercial polyamide-imide product, Torlon TM. The self-condensation of trimellitic acid isocyanate yields Upjohn's P2800 TM. Condensation of bisphenol and dinitrobisimide yields General Electric's commercial polyetherimide product, Ultem TM. Bismaleimides are produced by reacting maleic anhydride with diamines. Ciba-Geigy's P13N TM and Rhone-Poulenc's Kinel TM are commercial examples of reactive bismaleimides. Aromatic polyester, anhydrides and certain bismides yield polyesterimides, such as Dynamit Nobel's Icdal Ti40 TM. Aliphatic polyester anhydrides yield polyarylates. Other pure polyimides are Lenzing P84-HCM TM, Mitsui-Toatsu Aurum TM, Furon Meldin 3000 TM, National Starch Thermid TM and NASA Langley LaRC TPI series.

Polyimides are generally characterized by great backbone rigidity that yields exceptional high temperature strength and thermal stability. They are frequently used for high temperature applications [>230° C.]. As a result, they are used as bearing seals, gaskets, piston rings, pressure discs, sleeves, sliding rods, valve shafts, automotive and appliance gears, brake components, cams, exhaust valves and stems, copier gears and so on. They are also characterized by extreme processing difficulty. Many polyimides cannot be molded by conventional thermoplastic processing techniques. Others require very high processing temperatures [300° C. to 400° C. or more] and pressures [1000 atmospheres or more]. As a result, polyimides are usually processed as powders using powder metallurgical techniques such as hot isostatic pressing, direct forming and compaction-sinter-forging or by compression molding where the powder is placed in a heated mold, heated to a forming temperature, compressed into shape, then cooled in the mold while under pressure. Many parts are machined from billets. Alternately, the polymers are dissolved in a suitable solvent such as n-methylpyrrolidone. Small molded parts, thin films and carbon-fiber laminates are produced from these solutions. With polyamide-imide polymer, the polymer is injection molded or extruded while it is not fully imidized. The molded or extruded part is then reacted at elevated temperature but in the solid state to a fully imidized state. Fully imidized polyamideimide cannot be molded using conventional plastic process techniques. It is believed that amorphous polyimides require decomposition temperatures higher than their melt processing temperatures and that the melt processing temperatures must be at least 50° C. to 100° C. above the glass transition temperatures of the polymers.

The limited tractability of polyimides with conventional plastics processing equipment has restricted the development of many applications. It has now been found that polyimides, including reactive polyamide-imides, can be molded into articles of commerce by first rapidly heating the polymer powder without shear to proper molding temperature, then compressing the powder into the desired shapes using conventional compression molding techniques. In a similar fashion, polyimide powder can be first rapidly heated without shear to a proper molding temperature, then ram extruded into desired profiles. The method of rapid heating involves mechanically impacting and imparting kinetic energy to the powder particles in a batch-wise fashion, while restricting and controlling the transfer of energy from the particles to the chamber holding the powder particles. One device that is used as a powder heater is shown by Goeser et al, U.S. Pat. No. 3,266,738, published Aug. 16, 1966. This patent describes a high intensity mixer available on the market today, under the trade mark Gelimat, made by Draiswerke GmbH. The device includes a plurality of blades that rotate about a horizontal axis within an enclosed jacketed container. The rotational speed of the blades is controlled with tip speeds of up to 50 meters/second possible. In Crocker et al. U.S. Pat. No. Re. 33,214, this device is coupled with an infrared detector that continuously monitors the powder temperature to ensure adequate temperature control while the constant rotational speed of the blades exceeds 25 meters/second. In Crocker et al. U.S. Pat. No. 4,420,449, published Dec. 13, 1983, the device so equipped is used to thermokinetically heat polytetrafluoroethylene (PTFE) powder at constant tip speeds of at least 30 meters/second prior to forming. In Crocker U.S. Pat. No. 4,272,474, published Jun. 9, 1981, the device so equipped is used to thermokinetically heat ultrahigh molecular weight polyethylene (UHMWPE) powder at constant tip speeds of at least 18 meters/second prior to forming.

It has surprisingly been found that it is not possible to mechanically heat polyimide powders only using either continuous monitoring of powder temperature or constant tip speeds of 18 meters/second, 25 meters/second, or 30 meters/second or any other constant tip speeds. It has further surprisingly been found that the heating rate of polyimide powders can be altered over wide ranges with careful balance of the chamber wall temperature and the speed of the mechanical heating device. This control allows for uniform heating of powder charges of widely varying rates. It further allows for controlled heating of powder charges such that partially imidized powder can be solid state reacted to full imidization at temperatures a few degrees below the molding temperatures. It further allows for degassing, devolatilizing and dewatering of polyimides that might contain by-products of the condensation polymerization process including dissolved gases, volatile liquids, water, acetic acid, hydrochloric acid or other low boiling simple molecules. And it is further surprisingly been found that certain polyimides that are known to be unmoldable by any conventional plastic processing technique, can be mechanically heated to very high temperatures, typically in excess of their degradation temperature using a mechanical heating device with very hot chamber wall temperatures, in excess of 150° C., and that these polyimides, when discharged from the mechanical heating device, can be molded into useful monolithic articles using conventional compression molding techniques with molds having temperatures 10° C. to as much as 100° C. below the glass transition temperatures of the polyimide. And it is further surprisingly been found that the reground powders of certain polyimides known to have a certain degree of crosslinking, to be considered as having thermosetting characteristics and to otherwise be considered as having no reprocessing capability, can be mechanically heated in a mechanical heating device with very hot chamber walls and the discharge molded into useful monolithic articles using conventional compression molding techniques.

After the heated polyimide powder is discharged from the mechanical heating device, the charge is transferred to a mold or die contained in conventional plastics processing equipment such as a compression molding press, a transfer molding press, a ram extruder, a forging press or other hydraulically, pneumatically or mechanically assisted press whereupon pressure is applied that is adequate to force the charge into the desired shape in the mold or die that has a temperature about 10° C. to 100° C. or more below the glass transition temperature of the polymer. The pressure is held against the shaped charge until the charge retains the general shape of the mold cavity. Articles made in this fashion have essentially no porosity, essentially no internal voids, essentially no cracks and mechanical properties that are equal to or greater than those of polyimides fabricated in more traditional ways.

The present invention provides a process for producing an article from at least one polyimide polymer, the process consisting of setting the mechanical heating device chamber wall temperature, charging the device with a carefully measured amount of polyimide polymer powder, powering the impellers to heat the polymer powder for a specific period of time, reducing the impeller speed to a point where energy input from the impellers to the agitated powder just matches energy transfer from the agitated powder to the chamber walls, maintaining that state for a specific period of time to allow for solid state reaction, devolatilization, dewatering, degassing or other thermal conditioning to occur in the polyimide polymer powder, increasing impeller speed for a specified period of time, discharging the heated powder, transferring the powder charge to an appropriate conventional processing device and applying necessary pressure at specific mold or die temperature while the charge cools, to insure adequate formation of at least one desired monolithic article of commerce.

Although each polyimide polymer requires specific processing sequence, experience shows that a typical charge weight is 50 g to 250 g per liter volume of the mechanical heating device. Differences in charge weights must be compensated for by adjusting impeller speeds and the wall temperature of the mechanical heating device chamber. Heating rates of 2° C. to 10° C./second are desired during initial heating when the mechanical heating device wall chambers are approximately 100° C. below to 50° C. above the polymer glass transition temperature. The desired period of time when the heat input to the powder from the impellers just matches the heat output from the powder to the chamber walls is about 30 seconds but could be in the range of 1 to 60 seconds. The powder temperature during this period of time is above the glass transition temperature of the polyimide and preferably less than 150° C. above the glass transition temperature of the polyimide. Under no circumstances is the temperature to be equal to or greater than the temperature where the powder particles agglomerate. Experience shows that the heating rate subsequent to this time is 50° C. to 80° C./second, with polymer powder discharge temperatures of 50° C. to perhaps 150° C. above the glass transition temperature of the polymer. The total heating time for charges ranging in weights from 50 g to 250 g per liter volume of the mechanical heating device ranges from 15 seconds to 75 seconds and depends on the time required to react, devolatilize, dewater, degas, or otherwise thermally condition the powder below its glass transition temperature. As noted, thermal processing of the hot powder occurs with molds or dies at temperatures about 10° C. to 100° C. or more below the glass transition temperature of the polymer. Molding pressures are considered to be normal for the processing equipment, with compression molding and extrusion pressures on the order of 1,000 lb$_f$/in$^2$ [7 MPa]. Actual values depend on the nature of the polyimide being processed.

Certain polyimide polymers are commercially available and were noted earlier. Other polyimide polymers are experimental and so exact processing conditions have not been established.

The Draiswerke Gelimat used for mechanically heating polyimides had a 1-liter volume chamber capacity. The Gelimat has opposed impellers mounted on an axial shaft and driven by a variable speed motor that turns the shaft at up to 7000 revolutions/minute. The powder charge is ether screw-fed to the rotating device or dropped directly into the stationary device. Both versions of the device were used with equal success in this work. The heated powder is discharged via a pneumatically activated hatch in the bottom of the horizontal chamber. The horizontal chamber is double-walled such that cooling or heating fluid can maintain the chamber wall at a predetermined temperature. The chamber is operated at atmospheric pressure and any reactive by-products or dissolved vapors are vented through the end of the chamber. Tip speed is a function of the size of the heating chamber and the shaft speed. Speed control was achieved by manually changing the motor revolutions/minute, based on a preset time sequence. More accurate and reliable relay- and computer-controlled sequencing is an envisioned aspect of this invention.

The exact form of the mechanical heating device is not restricted to the commercially available Draiswerke Gelimat. Other mechanical heating devices having timed control of shaft speed and predetermined chamber wall temperature control are envisioned aspects of this invention.

As an example of the novel way of heating polymers in a mechanical heating device, Torlon ™ was used as an example of a reactive polyimide. Torlon ™ is available in a partially imidized state as Torlon 4000T ™ powder. The powder is characterized as light yellow and characteristically is injection moldable in that state.

In order to achieve optimum final property conditions, the molded part is then carefully heated in a ramping temperature oven over several hours to days. This heating profile allows complete solid state imidization to occur in the polymer. Fully imidized Torlon has a dark brown to near-black color. During imidization, water vapor, a by-product of the reaction, is diffused from the molded part. A measure of the completeness of imidization is the glass transition temperature of the polymer. The glass transition temperature of as-received Torlon 4000T TM is approximately 230° C.. The glass transition temperature of fully imidized Torlon is approximately 275° C.

In a set of tests using Torlon polyamide-imide, the Gelimat G1S was charged with 200 g samples. The Gelimat chamber wall temperature was measured to be 175° C.±10° C. The motor speed was maintained at 7000 revolutions/minute. The charges were dropped at fixed times and the charge temperature measured with a handheld thermocouple having a needle-nose probe. The measured temperatures are shown in Table I. As is apparent, the heating rate is linear with time, at 2° C./second.

TABLE I

Torlon 4000 Polyamide-imide Powder
Gelimat G1S Mechanical Heating Device
Batch Weight 200 g
Motor Speed 7000 RPM
Wall Temperature 175° C.

| Batch Number | Time, s | Temperature, °C. |
|---|---|---|
| 15-1 | 15 | 250 |
| 15-2 | 20 | 260 |
| 15-3 | 25 | 270 |
| 15-4 | 29 | 280 |
| 15-5 | 35 | 290 |

In another series of tests, batches of Torlon polyamide-imide ranging in weights from 50 g to 250 g in 50 g increments were processed in a Gelimat G1S mechanical heating device. The chamber wall temperature was measured at 200° C.±5° C. for these tests. The batches were charged directly into the device with the motor speed at 7000 revolutions/minute. The charges were manually discharged in 9.0±1.0 seconds and the batch temperatures were measured with a handle thermocouple having a needle-nose probe.

The results in Table II show that the heating rate does not depend on batch size over the range of 50 to 250 g per liter volume of the chamber. For this chamber temperature, the heating rate is approximately 30° C./second.

TABLE II

Torlon 4000 Polyamide-imide Powder
Gelimat G1S Mechanical Heating Device

| | Batch Weight | | | | |
|---|---|---|---|---|---|
| | 250 g | 200 g | 150 g | 100 g | 50 g |
| Chamber Temperature °C. | 200 | 200 | 205 | 200 | 200 |
| Discharge Time, s | 10 | 10 | 9 | 8 | 9 |
| Discharge Temperature °C. | 320 | 320 | 320 | 320 | 320 |

In yet another series of tests, batches of Torlon polyamide-imide were processed in a Gelimat G1 mechanical heating device. For this device, a Vanzetti infrared fiber optic device was used to monitor internal temperature. The device had a capability of sensing a maximum temperature of 410° C. From a series of experiments, the measured temperature was determined to be approximately 50° C. to 60° C. above actual polymer temperature, since the actual powder temperature was 350° to 360° C. at an indicated temperature of 410° C. It was determined that the heating rate of 200 g charge between 350° and 400° C. was 10° C./second. As a result, every charge was discharged from the unit at an indicated temperature of 400° C. plus a nominal 4 seconds depending on the particular testing conditions. Powder temperature was determined to be 390° C.±5° C. at that condition. As shown in Table III, the novel processing procedure was used to mold 4-inch diameter disks.

During the ramp up to the hold temperature, the Gelimat G1 frequency control was set at approximately 50% of the maximum setting or approximately 30 Hz. At that setting according to the 1991 Draiswerke Operating Manual, the motor speed was approximately 3200 revolutions/minute. During the hold period of up to 60 seconds, the frequency control was set at approximately 40% of the maximum setting or approximately 25 Hz. At that setting according to the 1991 Draiswerke Operating Manual, the motor speed was approximately 2600 revolutions/minute. These settings were manually achieved throughout the experiments described herein. With proper closed loop control, the preferred settings for the preferred periods of time could be achieved electronically. As seen in Table III, the maximum speed achievable by the mechanical heating device, to wit, 6400 revolutions/minute, was not required to fully heat the powder to the desired molding temperature of approximately 380° C.

TABLE III

Heating/Molding Conditions for Torlon TM
Polyamide-Imide Powder - 4-Inch Diameter Mold
Steam-Heated With Heater Band
Draiswerke G1 Gelimat
with Vanzetti Infrared Temperature Sensor

| Run No [Date] | Charge Weight [g] | Set Point Temperature [°C.] | Delay Time [s] | Time to Hold [s] | Hold Time [s] | Hold Temperature [°C.] | Total Heating Time [s] | Estimated Powder Temp [°C.] | Mold Temperature [°F.] | Mold Time [min] | Part Weight [g] | Comments |
|---|---|---|---|---|---|---|---|---|---|---|---|---|
| #6/218 | 200 | 415 | 0 | NR | 0 | NA | 12 | NA | 390 | 2.5 | NR | Foamy |
| #11/218 | 200 | 400 | 4.0 | 30 | 15 | 330 | 52 | 380 | 390 | 2.5 | 146 | Black core, granular surface |
| #13/218 | 200 | 400 | 4.0 | 30 | 30 | 370 | 81 | 380 | 400 | 2.5 | NR | Steaming at 370° C., granular surface |
| #14/218 | 200 | 400 | 4.0 | 30 | 30 | 350 | 70 | 375* | 410 | 2.5 | NR | Steaming at 350° C., 160° C. rotor/chamber temperature before |

TABLE III-continued

Heating/Molding Conditions for Torlon ™
Polyamide-Imide Powder - 4-Inch Diameter Mold
Steam-Heated With Heater Band
Draiswerke G1 Gelimat
with Vanzetti Infrared Temperature Sensor

| Run No [Date] | Charge Weight [g] | Set Point Temperature [°C.] | Delay Time [s] | Time to Hold [s] | Hold Time [s] | Hold Temperature [°C.] | Total Heating Time [s] | Estimated Powder Temp [°C.] | Mold Temperature [°F.] | Mold Time [min] | Part Weight [g] | Comments |
|---|---|---|---|---|---|---|---|---|---|---|---|---|
| #15/218 | 200 | 400 | 4.0 | 30 | 30 | 370 | 82** | 380 | 410 | 2.5 | 146 | charging, 190° C. after discharging Repeat of #14 except higher hold temperature, 170° C. rotor/chamber temperature before charging, 200° C. after discharging |
| #17/218 | 200 | 400 | 4.0 | 30 | 30 | 370 | 77 | 385* | 410 | 2.5 | 154 | Repeat of #15. |

*Thermocouple measured temperature on powder not charged to compression molding machine. Accuracy considered to be ±°C. since charge is cooling during measurement.
**Final rotor speed was set at approximately 80% of maximum speed.

Throughout the ramping and holding sequence, steam was observed exiting the vent pipe mounted in the face plate of the mechanical heating device. This steam is the moisture vapor liberated by polyamide-imide during its imidization reaction. The observed rate of venting of steam was used to obtain a desired time-temperature ramping sequence of approximately 5° C./second±3° C./second. The polyamide-imide powder was then held at the holding temperature of 360° C.±10° C. as indicated by the Vanzetti device, most probably at 300° C.±10° C. actual powder temperature, for a period of time sufficient to observe a near-cessation in the rate of steam venting. The near-cessation of steam venting was taken to be a direct measure to the near-completion of the imidization reaction. This time varied from approximately 10 seconds for charge weights of 100 g or less to 30 seconds for charge weights of 200 g or so. It was determined that regardless of the charge weights below about 250 g per liter volume of the mechanical heating device, hold times of 30 seconds were sufficient to achieve near-cessation of steam venting.

The discharged heated powder was then transferred manually to a 80T compression molding press. Several molds were used in this study, including a steam-heated 2-inch diameter disk mold, a steam- and electrically-heated 4-inch diameter disk mold, and an electrically-heated 5-inch diameter ashtray mold. The maximum mold temperature achieved for each of the molds is shown in Table IV. It is apparent that a mold temperature range of 425° to 500° F. is preferred with a most preferred range of 450° to 475° F. It is understood that this compression molding temperature range must be determined for each polyimide mechanically heated and molded in the manner described in this invention.

TABLE IV

Maximum Achievable Temperatures
for Compression Molds
Using Torlon 4000T PAI Powder

| Run No/Date | Mold Configuration | Maximum Mold Temperature [°F.] | Comments |
|---|---|---|---|
| #3/218 | 2-inch Disk Steam | 390 | Brown mottle surface, dark brown, black inside |
| #15/218 | 4-inch Disk Steam with heater band | 410 | Brown mottle surface, uniform black inside |
| #7/219 | 5-inch Ashtray electric heat | 470 | Smooth surface, some mottling, glossy |
| #9/219 | 5-inch Ashtray electric heat | 525 | No surface gloss, some mottling, appears too hot |
| #15/219 | 5-inch Ashtray electric heat | 450 ± 25° F. | Good appearance, some mottling, flash brittle, not compressed |

Several tests were conducted in order to determine whether the polyamide-imide was reacted using this novel approach. First, a 2-inch disk molded as #3/218 using a heating protocol similar to #13/218, was cut in half with a band-saw. Half the sample was placed in a 500° F. [260° C.] dry air oven for 48 hours. The sample was then cooled and its thickness and diameter measured and compared with the unheated half. No difference to ±0.005 inches was observed. It is know that as-molded Torlon 4000T cannot withstand 500° F. air environment without experiencing substantial distortion. Then, the density of the unheated half of the sample was obtained. The measured density of 1.37 g/cm$^3$ compares well with literature values of 1.40 g/cm$^3$. Then, small pieces of the unheated and oven-heated samples were subjected to differential scanning calorimetry to determine transition temperatures. The result are shown in Table V. The glass transition temperature of sample #3/218 is about the same as that for literature value of the glass transition temperature of fully cured Torlon ™ polyamide-imide. The glass transition temperature of that same sample is increased slightly by additional heating for 48 hours in a 260° C. oven. It is apparent that the technique used in the instant invention allows for simultaneously heating and reacting polyamide-imide powders to molding conditions, thereby circumventing the current cumbersome and unreliable technique of molding the partially imidized polyamideimide, then solid-state imidizing the polymer in the final molded form.

density of a section cut from #10/224 was determined to be 1.33±0.01 g/cm³. The literature value for P84 polyimide is 1.34 g/cm³.

TABLE V

TABLE VI

Heating/Molding Conditions for P84-HCM ™
Polyimide Powder - 4-Inch Diameter Mold
Steam Heated Without Heater Band*
Draiswerke G1 Gelimat
with Vanzetti Infrared Temperature Sensor
80T Compression Molding Press ≈
1,000 lbf/in² Applied Pressure

| Run No [Date] | Charge Weight [g] | Set Point Temperature [°C.] | Delay Time [s] | Time to Hold [s] | Hold Time [s] | Hold Temperature [°C.] | Total Heating Time [s] | Estimated Powder Temp [°C.]† | Mold Temperature [°F.] | Mold Time [min] | Part Weight [g] | Comments |
|---|---|---|---|---|---|---|---|---|---|---|---|---|
| #5/224 | 250 | 400 | 4 | 0 | 0 | 0 | 39 | NA | 240 | 3.0 | NR | Sandy, crumbly, steaming, 100% rotor speed control setting = 6440 rev/min. |
| #6/224 | 250 | 400 | 4 | 30** | 30 | 370 | 53 | 385 | 240 | 3.0 | NR | Sandy surface, black monolithic core, polyimide steaming during heating |
| #10/224 | 250 | 400 | 4 | 30** | 30 | 370 | 57 | 380 | 250 | 3.0 | NR | Dark brown surface, sandy, disk machined to black, monolithic core. Rotor temperature = 215° C. after discharging |

*Lenzing Recommended Mold Temperature of 340° C. Could Not Be Achieved With Mold.
**Time Measured at 300° C. during Ramp-up.
†Vanzetti Device Reading Determined to be 60° C. Above Actual Temperature.

| Character | Glass Transition Temperature [°C.] |
|---|---|
| Literature - 4000T | 230 |
| Measured - 4000T in this invention | 238.1 ± 0.3 |
| #3/218 - As-molded | 282.0 ± 0.3 |
| #3/218 - As-molded + 48 hours in 260° C. Air Oven | 287.1 ± 0.3 |
| Literature - Fully Cured | 275 |

Glass Transition Temperatures of Polyamide-Imide Polymeric States - Measured on Differential Scanning Calorimeter In yet another set of experiments, Lenzing compression molding polyimide powder designated as P84-HCM ™ [40/100 mesh] was heated to a Vanzetti set point temperature of 400° C.+4 seconds, then compression molded into 4-inch diameter disks using an isothermal steam-heated mold at 240° F. [115° C.]. In the first trials, the powder was heated directly to molding condition without delay. The powder could not be compacted into a useful disk. When the powder was heated in the fashion described above for the polyamide-imide, the polyimide could be molded into solid disks, albeit with granular surfaces owing to the low mold temperature. The results are shown in Table VI.

A representative heating rate for P84-HCM polyimide powder is shown in Table VII. The heating rate profile is similar to that used to heat the reactive polyamide-imide. During the heating and holding sequences, the polymer powder off-gassed in much the same way as the reactive polyamide-imide powder. Although the exhausted vapor appeared to be steam and was condensed on a cold metallic surface, the condensate was not analyzed. This off-gassing was unexpected. However, it appeared to be necessary since attempts to mold polyimide powder that had not been heated in the proscribed programmed fashion were unsuccessful. The The 4-inch diameter disks designated as Run #5/224 and Run #6/224 were sent to Lenzing for material property evaluation. Table VIII summarizes the Lenzing test report.

TABLE VII

Heating Rate for
Lenzing P84-HCM
Polyimide Powder - 250 g
Draiswerke G1 Gelimat
with Vanzetti Infrared Temperature Sensor

| Run No. [Date] | Indicated Temperature [°C.] | Time [s] | Speed Control Setting [%] |
|---|---|---|---|
| #4/224 | 155 | 0 | ≈45 |
| 250 g | 200 | 10 | ≈45 |
| | 250 | 15 | ≈45 |
| | 300 | 20 | ≈45 |
| | 350 | 30 | ≈45 |
| | 390 ⎫ 10 s Hold | 40 | ≈35 |
| | 390 ⎭ | 50 | ≈35 |
| | 400 + 4.0 s | 57 | 100 |

35% Speed Control Setting = 2760 rev/min = 18.4 m/s
45% Speed Control Setting = 3830 rev/min = 25.6 m/s
100% Speed Control Setting = 6440 rev/min = 43.0 m/s

TABLE VIII

Test Data
Lenzing P84 HCM 40/100
Molded Using
Draiswerke G1 Gelimat with
Vanzetti Infrared Temperature Sensor

| Property | Sample Number #5/224 | Sample Number #6/224 | Literature Value |
|---|---|---|---|
| Density, g/cm³ | 1.337 | 1.338 | 1.34 |
| Hardness, Shore D | 89-90 | 89-90 | 88 |
| Flexural Strength N/mm² | 95.6 | 76.3 | 205 |
| Elongation at | 2.2 | 1.9 | 7 |

TABLE VIII-continued

Test Data
Lenzing P84 HCM 40/100
Molded Using
Draiswerke G1 Gelimat with
Vanzetti Infrared Temperature Sensor

| Property | Sample Number #5/224 | Sample Number #6/224 | Literature Value |
|---|---|---|---|
| Break, % | | | |

Conclusion:
Hardness and density are satisfactory. Flexural strength and elongation are low, probably due to compression mold temperature being too low.

In Tables III, VI and VII, the Vanzetti infrared temperature sensor indicated temperatures that were approximately 50° C. to 60° C. above actual temperature. In all tests described here, pressure on the heated powder was applied using an 80T compression molding press and pressures of approximately 1,000 to 2,000 lb$_f$/in$^2$.

Whereas compression molding of disks and shapes is the only secondary processing step described herein for the forming of shapes of polyimides beginning with powder, it is obvious to anyone skilled in the art that other types of shaping and forming are also possible using the powder heated in the manner described in this patent. As an example, the hot powder can be charged directly to a transfer mold, wherein a heated chamber fitted with a high speed piston transfers the heated powder to cavities in a compression mold. And in another example, the hot powder can be charged directly to the inlet of a ram extruder for the production of continuous shaped articles. And in yet another example, the hot powder can be consolidated into a monolithic sheet by introducing the powder directly in the nip between two high pressure rolls.

Although the above describes the preferred embodiments of the invention, many variations and amendments to the process described herein can be made without departing from the scope of the invention.

The invention is claimed as follows:

1. A process for producing shaped or molded articles made of polymer particles containing aromatic imide linkages, said process comprising the steps of:
   (a) introducing said polymer particles into heating means for heating said polymer particles, said heating means comprising an enclosed chamber having a rotatable blade therein;
   (b) heating said polymer particles to a forming temperature by rotating said blade in said chamber;
   (c) discharging said polymer particles into a shaping device; and
   (d) pressurizing said polymer particles in said shaping device until said polymer particles consolidate into the shape of said shaping device.

2. The process according to claim 1 wherein said polymer particles are condensation polymers produced from reaction of bi-functional diamine and a bifunctional carboxylic acid anhydride.

3. The process according to claim 1 wherein said polymer particles are condensation polymers produced from reaction of a bi-functional diamine and a tetrafunctional carboxylic acid anhydride.

4. The process according to claim 1 wherein said polymer particles are aromatic polyimide polymers.

5. The process according to claim 1 wherein said polymer particles are thermoplastic polyimide polymers.

6. The process according to claim 1 wherein said polymer particles are polyetherimide polymers.

7. The process according to claim 1 wherein said polymer particles are bismaleimide polymers.

8. The process according to claim 1 wherein said polymer particles are aromatic polyarylate polymers.

9. The process according to claim 1 wherein said polymer particles are amide-imide polymers.

10. The process according to claim 1 wherein said step (b) is carried out for a time and at conditions so that said polymer particles comprises fully reacted aromatic imide linkages.

11. The process according to claim 1 wherein said step (b) is carried out for a time and at conditions so that off-gassing and devolatilizing of said polymer particles occurs.

12. The process according to claim 1 wherein said step (b) is carried out for a time and at conditions so that dewatering of said polymer particles occurs.

13. The process according to claim 1 wherein said step (b) comprises controlled initial heating rates of said polymer particles between 2° C. and 20° C./second.

14. The process according to claim 1 wherein said step (b) comprises a holding time of 0 to 30 seconds at a given temperature to allow for reaction, degassing, and dewatering.

15. The process according to claim 1 wherein said step (b) comprises a holding time of 0 to 30 seconds at a nearly constant temperature between 280° C. and 400° C.

16. The process according to claim 1 wherein said step (b) is carried out at nearly constant temperature, said nearly constant temperature being maintained by maintaining said blade at a certain blade speed, energy transferred to said polymer particles from said blade being equal to energy transferred from said polymer particles to said chamber.

17. The process according to claim 1 wherein said polymer particles are discharged from said chamber at a discharge temperature between 300° C. and 500° C.

18. The process according to claim 1 wherein said step (b) comprises, after a holding time has elapsed, heating said polymer particles at a rate of between 5° C. per second and 50° C. per second.

19. The process according to claim 1 wherein said heating in step (c) ceases, prior to degradation of said polymer particles.

20. The process according to claim 1 wherein a total heating time of said step (b) is less than 200 seconds.

21. The process according to claim 20 wherein a total heating time is between 45 seconds and 75 seconds.

22. The process according to claim 1 wherein said polymer particles are nearly instantaneously added to said enclosed container in a fixed amount.

23. The process according to claim 1 wherein said polymer particles are nearly instantaneously discharged from said container when said polymer particles reach a certain discharge temperature.

24. The process according to claim 1 wherein said shaping device is a mold cavity of a compression molding press.

25. The process according to claim 1 wherein said shaping device is a ram extruder.

26. The process according to claim 1 wherein said shaping device is a two-roll mill.

27. The process according to claim 1 wherein said shaping device is a mold cavity of a transfer molding press.

28. The process according to claim 14 wherein the pressure applied to said polymer discharge is between 1000 and 4000 lb$_f$/in$^2$.

29. The process according to claim 14 wherein a temperature of a mold cavity is said shaping device is below the glass transition temperature of said polymer particles.

30. The process according to claim 14 wherein the temperature of a mold cavity in said shaping device is between 10° C. and 100° C. below the glass transition temperature of said polymer particles.

31. The process according to claim 14 wherein said polymer particles are held under pressure in a mold cavity in said shaping device for a time sufficient to rigidify said polymer particles into a final shape.

32. The process according to claim 14 wherein the time under pressure in a mold cavity in said shaping device is between 2 and 10 minutes.

33. The process of claim 1 wherein said process further comprises the step of, prior to step (a):
setting a temperature of an inner wall of said chamber.

34. The process of claim 1 wherein said process further comprises the step of controlling a rate of heating said polymer particles in step (b) by controlling the amount of time said blade rotates.

35. The process of claim 1 wherein said process further comprises controlling a blade speed of said blade so that energy transferred to said polymer particles from said blade is equal to energy transferred from said polymer particles to an inner wall of said chamber.

36. The process of claim 35 wherein said process further comprises the step of controlling said blade speed a specific period of time to allow for solid state reaction of said polymer particles.

37. The process of claim 35 wherein said process further comprises the step of controlling said blade speed a specific period of time to allow for devolatilization of said polymer particles.

38. The process of claim 35 wherein said process further comprises the step of controlling said blade speed a specific period of time to allow for dewatering of said polymer particles.

39. The process of claim 35 wherein said process further comprises the step of controlling said blade speed a specific period of time to allow for degassing of said polymer particles.

40. The process of claim 35 wherein said process further comprises the step of controlling said blade speed a specific period of time to allow for thermal conditioning of said polymer particles.

41. The process of claim 1 wherein said process further comprises compensating for differing charge weights of said polymer particles by adjusting blade speed and an inner wall temperature of an inner wall of said chamber.

42. A process for molding articles made of a polymer containing aromatic imide linkages, said process comprising the steps of:
(a) heating inner wall of an enclosed chamber to a temperature between 100° C. below and 50° C. above a glass transition temperature of said polymer;
(b) introducing said polymer into said enclosed chamber, said enclosed chamber having a rotatable blade therein;
(c) heating said polymer to a temperature T$_1$ above the glass transition temperature of said polymer but less than 150° C. above said glass transition temperature, said heating being at a rate between 2° C. per second and 10° C. per second for a period between 1 second and 60 seconds;
(d) discharging said polymer into a shaping device; and,
(e) pressurizing said polymer into said shaping device until said polymer consolidates into the shape of said shaping device.

43. The process of claim 42 wherein said temperature T$_1$ is below a temperature where said polymer agglomerates.

44. The process of claim 43 wherein said shaping device is at a temperature of 10° C. to 100° C. below said glass transition temperature of said polymer.

* * * * *